(12) United States Patent
Carrillo et al.

(10) Patent No.: US 8,017,697 B2
(45) Date of Patent: Sep. 13, 2011

(54) POLY(ARYLENE ETHER)-POLYSILOXANE COMPOSITION AND METHOD

(75) Inventors: Alvaro Carrillo, Delmar, NY (US); Stephen Farnell, Mechanicville, NY (US); Hua Guo, Selkirk, NY (US); Gerardo Rocha-Galicia, Clifton Park, NY (US); Farah Jean-Jacques Toublan, New York, NY (US)

(73) Assignee: Sabic Innovative Plastics IP B.V. (NL)

( * ) Notice: Subject to any disclaimer, the term of this patent is extended or adjusted under 35 U.S.C. 154(b) by 170 days.

(21) Appl. No.: 12/277,835

(22) Filed: Nov. 25, 2008

(65) Prior Publication Data

US 2009/0318635 A1  Dec. 24, 2009

Related U.S. Application Data

(60) Provisional application No. 61/075,100, filed on Jun. 24, 2008.

(51) Int. Cl.
*C08G 65/48* (2006.01)
(52) U.S. Cl. .......... 525/393; 525/474; 525/476; 528/25; 528/29; 528/33; 528/43
(58) Field of Classification Search .................. 524/133, 524/393, 402, 403, 405, 436; 525/393, 396, 525/394, 472, 474, 476; 528/25, 26, 29, 528/31, 32, 33, 35
See application file for complete search history.

(56) References Cited

U.S. PATENT DOCUMENTS

| | | | |
|---|---|---|---|
| 2,071,250 A | 7/1931 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,465,319 A | 3/1949 | Whinfield |
| 2,512,606 A | 6/1950 | Bolton et al. |
| 2,720,502 A | 10/1955 | Caldwell |
| 2,727,881 A | 12/1955 | Caldwell |
| 2,822,348 A | 2/1958 | Haslam |
| 3,047,539 A | 7/1962 | Pengilly |
| 3,379,792 A | 4/1968 | Finholt |
| 3,671,487 A | 6/1972 | Abolins |
| 3,953,394 A | 4/1976 | Fox et al. |
| 4,128,526 A | 12/1978 | Borman |
| 4,226,761 A | 10/1980 | Cooper et al. |
| 4,664,972 A | 5/1987 | Connolly |
| 4,769,424 A | 9/1988 | Takekoshi et al. |
| 4,814,392 A | 3/1989 | Shea et al. |
| 4,822,836 A | 4/1989 | Wroczynski |
| 4,871,816 A | 10/1989 | Percec et al. |
| 4,879,346 A | 11/1989 | Bopp et al. |
| 4,970,272 A | 11/1990 | Gallucci |
| 5,021,543 A | 6/1991 | Mayska et al. |
| 5,032,635 A | 7/1991 | Avakian et al. |
| 5,061,746 A | 10/1991 | Gallucci et al. |
| 5,110,896 A | 5/1992 | Waggoner et al. |
| 5,132,365 A | 7/1992 | Gallucci |
| 5,169,887 A | 12/1992 | Snow et al. |
| 5,204,438 A | 4/1993 | Snow et al. |
| 5,258,455 A | 11/1993 | Laughner et al. |
| 5,281,686 A | 1/1994 | Blohm et al. |
| 5,294,655 A | 3/1994 | Lee, Jr. |
| 5,357,003 A | 10/1994 | Smits et al. |
| 5,357,022 A | 10/1994 | Banach et al. |
| 5,364,898 A | 11/1994 | Lee, Jr. et al. |
| 5,385,984 A | 1/1995 | Blohm et al. |
| 5,470,913 A | 11/1995 | van der Meer et al. |
| 5,484,858 A | 1/1996 | Smits et al. |
| 5,596,048 A | 1/1997 | Blohm et al. |
| 5,625,011 A | 4/1997 | Palsule |
| 5,693,700 A | 12/1997 | Venkataramani et al. |
| 5,714,550 A | 2/1998 | Shaw |
| 5,916,952 A | 6/1999 | Romenesko et al. |
| 6,025,419 A | 2/2000 | Kasowski et al. |
| 6,072,011 A | 6/2000 | Hoover |
| 6,339,131 B1 | 1/2002 | Cella et al. |
| 6,593,411 B2 | 7/2003 | Koevoets et al. |
| 7,166,243 B2 | 1/2007 | Elkovitch et al. |
| 7,329,708 B2 | 2/2008 | Birsak et al. |
| 7,449,507 B2 | 11/2008 | Fishburn |
| 7,534,822 B2 | 5/2009 | Elkovitch et al. |
| 7,541,421 B2 | 6/2009 | Carrillo et al. |
| 7,592,382 B2 | 9/2009 | Borade et al. |
| 7,608,651 B2 | 10/2009 | Borade et al. |
| 7,803,856 B2 | 9/2010 | Perego et al. |
| 7,847,032 B2 | 12/2010 | Guo et al. |
| 2004/0260036 A1 | 12/2004 | Fishburn |
| 2005/0171323 A1 | 8/2005 | Kamps et al. |
| 2005/0250885 A1 | 11/2005 | Mercx et al. |

(Continued)

FOREIGN PATENT DOCUMENTS

CA  2052488 A1  4/1992

(Continued)

OTHER PUBLICATIONS

Written Opinion and International Search Report; International Application No. PCT/US2009/045280; International Filing Date May 27, 2009 (8 pages).

(Continued)

*Primary Examiner* — David W Wu
*Assistant Examiner* — Robert Jones
(74) *Attorney, Agent, or Firm* — Cantor Colburn LLP

(57) ABSTRACT

A thermoplastic composition includes a poly(arylene ether) and a poly(arylene ether)-polysiloxane block copolymer. The thermoplastic composition is prepared by a method that includes oxidatively copolymerizing a monohydric phenol and a hydroxyaryl-terminated polysiloxane. The method is simpler than prior methods of preparing poly(arylene ether)-polysiloxane block copolymers by linking pre-formed poly(arylene ether) and polysiloxane blocks. The method is also produces greater incorporation of polysiloxane into the poly(arylene ether)-polysiloxane block copolymer than prior methods of copolymerizing monohydric phenols and hydroxyaryl-terminated polysiloxane.

5 Claims, No Drawings

U.S. PATENT DOCUMENTS

| | | | |
|---|---|---|---|
| 2005/0261417 | A1 | 11/2005 | Mezzenga et al. |
| 2006/0058432 | A1 | 3/2006 | Perego et al. |
| 2006/0106139 | A1 | 5/2006 | Kosaka et al. |
| 2006/0111484 | A1 | 5/2006 | Fishburn |
| 2006/0111548 | A1 | 5/2006 | Elkovitch et al. |
| 2006/0149000 | A1 | 7/2006 | Ikuta et al. |
| 2006/0167143 | A1 | 7/2006 | Borade et al. |
| 2006/0182967 | A1 | 8/2006 | Kosaka et al. |
| 2007/0100088 | A1 | 5/2007 | Gallucci et al. |
| 2007/0112132 | A1 | 5/2007 | Zhao et al. |
| 2007/0208144 | A1 | 9/2007 | Delsman et al. |
| 2007/0208159 | A1 | 9/2007 | McCloskey et al. |
| 2007/0244231 | A1 | 10/2007 | Borade et al. |
| 2008/0071036 | A1* | 3/2008 | Delsman et al. .............. 525/396 |

FOREIGN PATENT DOCUMENTS

| | | | |
|---|---|---|---|
| EP | 714951 | A1 | 11/1994 |
| EP | 683209 | A2 | 5/1995 |
| EP | 1253164 | A1 | 10/2002 |
| GB | 1353501 | A | 5/1974 |
| WO | 87/07281 | A1 | 12/1987 |
| WO | 98/08898 | A1 | 3/1998 |
| WO | 0140353 | A1 | 6/2001 |
| WO | 2007/106296 | A2 | 9/2007 |

OTHER PUBLICATIONS

R.D. Allen and J.L. Hendrick, "Synthesis and properties of xylenyl ether-dimethylsioloxane triblock polymers", Polymer Bulletin, vol. 19, pp. 103-110 (1988).

Douglas A. Skoog et al., "Principles of Instrumental Analysis", 4th Edition, Saunders College Publishers, Harcourt Brace College Publishers, New York (1992), pp. 568-578.

ASTM D2857-95, "Standard Practice for Dilute Solution Viscosity of Polymers".

ASTM D 2240-05, "Standard Test Method for Rubber Property—Durometer Hardness".

ASTM D1238 Standard Test Method for Melt Flow Rates of Thermoplastics by Extrusion Plastometer.

ASTM D790 Standard Test Methods for Flexural Properties of Unreinforced and Reinforced Plastics and Electrical Insulating Materials.

ASTM D638 Standard Test Method for Tensile Properties of Plastics.

JP 20038, Jul. 19, 1994, Translation.

JP 231769, Aug. 19, 2004, Translation.

JP 252214, Nov. 10, 1986, Translation.

JP57-195122, Nov. 30, 1982, Translation.

JP 2004231789 Abstract, 1 page.

UL 94 Tests for Flammability of Plastic Materials for Parts in Devices and Appliances.

UL 1581 Reference Standard for Electrical Wires, Cables, and Flexible Cords.

K.P. Chan et al., Facile Quantitative Analysis of Hydroxyl End Groups of Poly (2,6-dimethyl-1, 4-phenylene oxide)s by P NMR Spectroscopy, Macromolecules, vol. 27, pp. 6371-6375, Abstract, 1 page.

Ablemarle, Saytex HP-3010 Flame Retardant, Feb. 2008, 2 pages.

ASTM D 648-07, Standard Test Method for Deflection Temperature of Plastics Under Flexural Load in the Edgewise Position, Downloaded Jan. 12, 2009, 13 pages.

ASTM D 3763-08, Standard Test Method for High Speed Puncture Properties of Plastics Using Load and Displacement Sensors, Downloaded Jul. 12, 2010, 9 pages.

Clariant, Exolit OP 1312, Flame Retardants PHP, Edition Feb. 4, 2009, 2 pages.

Clariant, Exolit Overview, Nov. 2008 Edition, 8 pages.

JP 2002047409, Publication date: Feb. 12, 2002, Abstract, 1 page.

JP 2003105193, Publication date: Apr. 9, 2003, Abstract, 1 page.

JP 2005333698, Publication date: Dec. 2, 2005, Abstract, 1 page.

JP 3126744, Publication date: May 29, 1991, Abstract, 1 page.

JP 4077552, Publication date: Mar. 11, 1992, Abstract, 1 page.

JP 61-252214, Publication date: Nov. 10, 1986, Abstract.

JP 6200015, Publication date: Jul. 19, 2004, Abstract, 1 page.

JP 63202652, Publication date: Aug. 22, 1988, Abstract, 1 page.

JP 9003322, Publication date: Jan. 7, 1997, Abstract, 1 page.

JP 9279044, Publication date: Mar. 11, 1992, Abstract, 1 page.

Pape et al., The Role of Silicone Powders in Reducing the Heat Release Rate and Evolution of Smoke in Flame Retardant Thermoplastics, Journal of Vinyl & Additive Technology, Sep. 1997, vol. 3, No. 3, 225-232.

International Search Report, PCT/US2009/064110, Date of Mailing: May 27, 2010, 8 pages.

Weil et al., Flame Retardants for Plastics and Textiles, Practical Applications, brominated book excerpt, 8 pages.

Written Opinion of the International Searching Authority, International Application No. PCT/US2009/064110, International Filing Date: Nov. 12, 2009.

U.S. Appl. No. 12/331,802, filed Dec. 10, 2008; Non-Final Office Action dated Jan. 27, 2010; 7 pages.

U.S. Appl. No. 12/331,802, filed Dec. 10, 2008; Notice of Allowance dated May 27, 2010; 4 pages.

U.S. Appl. No. 12/331,802, filed Dec. 10, 2008; Notice of Allowance dated Jul. 2, 2010; 4 pages.

U.S. Appl. No. 12/331,802, filed Dec. 10, 2008; Notice of Allowance dated Aug. 23, 2010; 6 pages.

U.S. Appl. No. 12/331,802, filed Dec. 10, 2008.

U.S. Appl. No. 12/644,272, filed Dec. 22, 2009.

U.S. Appl. No. 12/644,144, filed Dec. 22, 2009.

International Preliminary Report on Patentability and Written Opinion of the International Searching Authority; International Application No. PCT/US2009/045280; International Filing Date May 27, 2009; 6 pages.

U.S. Appl. No. 12/644,221, filed Dec. 22, 2009.

U.S. Appl. No. 13/043,502, filed Mar. 9, 2011.

U.S. Appl. No. 13/043,506, filed Mar. 9, 2011.

International Search Report and Written Opinion for PCT/IB2010/055482, mailing date May 13, 2011, 4 pages.

U.S. Appl. No. 13/043,502 Non-Final Rejection, notification date Jun. 2, 2011, 11 pages.

U.S. Appl. No. 12/644,221 Non-Final Rejection, notification date May 2, 2011, 31 pages.

Written Opinion for PCT/IB2010/055482, international filed Nov. 29, 2010, 6 pages.

* cited by examiner

POLY(ARYLENE ETHER)-POLYSILOXANE COMPOSITION AND METHOD

CROSS REFERENCE TO RELATED APPLICATION

This application claims the benefits of U.S. Provisional Patent Application Ser. No. 61/075,100 filed Jun. 24, 2008, which is fully incorporated herein by reference.

BACKGROUND OF THE INVENTION

Block copolymers comprising a poly(arylene ether) block and a polysiloxane block are known materials that are useful components of various thermoplastic and thermoset compositions. Their polysiloxane content makes them useful as flame retardant additives. They can also be employed as compatibilizers to stabilize otherwise poorly compatible blends of polysiloxanes with aromatic polymers, such as polystyrenes, poly(arylene ether)s, aromatic polyesters, aromatic polyamides, and aromatic polyimides.

Some known methods for preparing poly(arylene ether)-polysiloxane block copolymers involve the linking of preformed poly(arylene ether) and polysiloxane groups to each other. For example, in U.S. Pat. No. 4,871,816 to Percec et al, silyl hydride-terminated polysiloxane blocks are linked to vinyl-terminated polyarylene polyether blocks via a hydrosilylation reaction. Thus, these known methods involve at least three steps, the first step to form a poly(arylene ether) block with reactive terminal functionality, the second step to form a polysiloxane block with at least one end group capable of reacting with the poly(arylene ether) reactive terminal functionality, and the third step to covalently link the poly(arylene ether) and polysiloxane blocks.

It would be efficient and economically advantageous to prepare poly(arylene ether)-polysiloxane copolymers with fewer processing steps, and some efforts have been made toward this end. For example, Banach et al. in U.S. Pat. No. 5,357,022 have reported the oxidative coupling of 2,6-xylenol and a silicone macromer having terminal phenol groups. However, attempts to reproduce the reaction conditions of Banach et al. have resulted in products in which much of the phenol-terminated silicone macromer is not covalently linked to a polyphenylene ether block and the isolated product as a whole has a relatively low intrinsic viscosity (typically about 0.2 deciliter per gram). The reaction products of Banach are therefore of limited use as flame retardant additives or compatibilizers, because they tend to segregate into two distinct and poorly compatible phases, one consisting largely of polyphenylene ether homopolymer, and the other consisting largely of the phenol-terminated silicone macromer.

There is therefore a need for improved methods of synthesizing poly(arylene ether)-polysiloxane copolymers with improved incorporation of the polysiloxane into the desired block copolymers.

BRIEF DESCRIPTION OF THE INVENTION

The above-described and other drawbacks are alleviated by a thermoplastic composition, comprising: a poly(arylene ether); and a poly(arylene ether)-polysiloxane block copolymer comprising a poly(arylene ether) block, and a polysiloxane block comprising, on average, 35 to 80 siloxane repeating units; wherein the thermoplastic composition comprises 1 to 8 weight percent siloxane repeating units and 12 to 99 weight percent arylene ether repeating units; wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of at least 30,000 atomic mass units.

Another embodiment is a method of preparing a thermoplastic composition, comprising: oxidatively copolymerizing a monohydric phenol and a hydroxyaryl-terminated polysiloxane to form a thermoplastic composition; wherein the oxidative copolymerization is initiated in the presence of at least 50 weight percent of the hydroxyaryl-terminated polysiloxane and less than or equal to 50 weight percent of the monohydric phenol; wherein the oxidative copolymerization is conducted with a reaction time greater than or equal to 110 minutes; wherein the hydroxyaryl-terminated polysiloxane comprises, on average, 35 to 80 siloxane repeating units; and wherein the hydroxyaryl-terminated polysiloxane constitutes 1 to 8 weight percent of the combined weight of the monohydric phenol and the hydroxyaryl-terminated polysiloxane.

Another embodiment is a thermoplastic composition prepared by a method, comprising: oxidatively copolymerizing a monohydric phenol and a hydroxyaryl-terminated polysiloxane to form a thermoplastic composition; wherein the oxidative copolymerization is initiated in the presence of at least 50 weight percent of the hydroxyaryl-terminated polysiloxane and less than or equal to 50 weight percent of the monohydric phenol; wherein the oxidative copolymerization is conducted with a reaction time greater than or equal to 110 minutes; wherein the hydroxyaryl-terminated polysiloxane comprises, on average, 35 to 80 siloxane repeating units; and wherein the hydroxyaryl-terminated polysiloxane constitutes 1 to 8 weight percent of the combined weight of the monohydric phenol and the hydroxyaryl-terminated polysiloxane.

These and other embodiments are described in detail below.

DETAILED DESCRIPTION OF THE INVENTION

In the course of research on efficient syntheses of poly (arylene ether)-polysiloxane block copolymers, the present inventors determined that prior art methods nominally intended for copolymerization of monohydric phenol and hydroxyaryl-terminated polysiloxane often resulted largely in the homopolymerization of the monohydric phenol. In other words, a large fraction of the hydroxyaryl-terminated polysiloxane was not incorporated into block copolymer and remained, unreacted, in the isolated product. The isolated product was therefore much less useful as a flame retardant additive or a compatibilizer, because the unreacted hydroxyaryl-terminated polysiloxane was incompatible with aromatic polymers.

The present inventors have discovered that several factors improve the incorporation of hydroxyaryl-terminated polysiloxane into a poly(arylene ether)-polysiloxane block copolymer. Chief among these are methods of addition of the hydroxyaryl-terminated polysiloxane and the monohydric phenol to the reaction mixture, the total reaction time, and the number of siloxane repeating units in the hydroxyaryl-terminated polysiloxane. The effect of total reaction time is particularly surprising, because oxidative coupling of the monohydric phenol is expected to be substantially complete within the reaction times taught by Banach, yet extending the reaction time was observed to increase the apparent coupling between the hydroxyaryl-terminated polysiloxane and the monohydric phenol. Furthermore, the progress of polysiloxane block incorporation into block copolymer as a function of time is highly non-linear, with an abrupt increase in incorporation typically occurring at times substantially longer than those used for homopolymerization of monohydric phenols. Using the presently described method, the present inventors have been able to generate very effective incorporation of hydroxyaryl-terminated polysiloxane into block copolymer. The reaction product is therefore distinct from the product of prior art copolymerizations of monohydric phenol and hydroxyaryl-terminated polysiloxane.

Thus, one embodiment is a thermoplastic composition, comprising: a poly(arylene ether); and a poly(arylene ether)-polysiloxane block copolymer comprising a poly(arylene ether) block, and a polysiloxane block comprising, on average, 35 to 80 siloxane repeating units; wherein the thermoplastic composition comprises 1 to 8 weight percent siloxane repeating units and 12 to 99 weight percent arylene ether repeating units; wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of at least 30,000 atomic mass units.

The thermoplastic composition comprises a poly(arylene ether). The poly(arylene ether) is the product of polymerizing the monohydric phenol alone and is a by-product of the block copolymer synthesis. When the monohydric phenol consists of a single compound (for example, 2,6-dimethylphenol), the poly(arylene ether) is the product of homopolymerizing that single monohydric phenol. When the monohydric phenol comprises two or more distinct monohydric phenol species (for example, a mixture of 2,6-dimethylphenol and 2,3,6-trimethylphenol), the poly(arylene ether) is the product of copolymerizing the two or more distinct monohydric phenol species. Using the nuclear magnetic resonance methods described in the working examples, it has not been possible to allocate the phenylene ether residues between poly(arylene ether) and poly(arylene ether)-polysiloxane block copolymer. However, the presence of poly(arylene ether) is inferred from the presence of "tail" groups as defined below (e.g., 2,6-dimethylphenoxy groups when the monohydric phenol is 2,6-dimethylphenol) and/or the presence of "biphenyl" groups as defined below (e.g., the residue of 3,3',5,5'-tetramethyl-4,4'-biphenol) in the isolated product.

In addition to the poly(arylene ether), the thermoplastic composition comprises a poly(arylene ether)-polysiloxane block copolymer. The poly(arylene ether)-polysiloxane block copolymer comprises a poly(arylene ether) block and a polysiloxane block. The poly(arylene ether) block is a residue of the polymerization of the monohydric phenol. In some embodiments, the poly(arylene ether) block comprises arylene ether repeating units having the structure

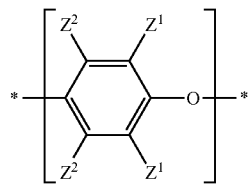

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom. In some embodiments, the poly(arylene ether) block comprises 2,6-dimethyl-1,4-phenylene ether repeating units, that is, repeating units having the structure

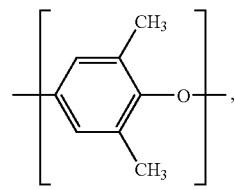

2,3,6-trimethyl-1,4-phenylene ether repeating units, or a combination thereof.

The polysiloxane block is a residue of the hydroxyaryl-terminated polysiloxane. In some embodiments, the polysiloxane block comprises repeating units having the structure

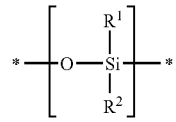

wherein each occurrence of $R^1$ and $R^2$ is independently hydrogen, $C_1$-$C_{12}$ hydrocarbyl or $C_1$-$C_{12}$ halohydrocarbyl; and the polysiloxane block further comprises a terminal unit having the structure

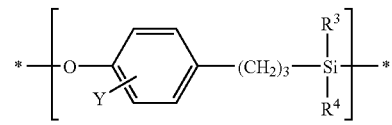

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl. In some embodiments, the polysiloxane repeating units comprise dimethylsiloxane (—Si(CH$_3$)$_2$O—) units. In some embodiments, the polysiloxane block has the structure

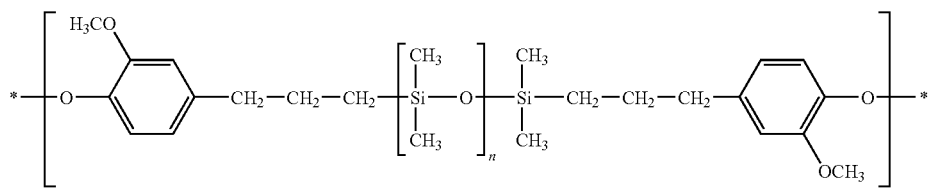

wherein n is 35 to 60.

The hydroxyaryl-terminated polysiloxane comprises at least one hydroxyaryl terminal group. In some embodiments, the hydroxyaryl-terminated polysiloxane has a single hydroxyaryl terminal group, in which case a poly(arylene ether)-polysiloxane diblock copolymer is formed. In other embodiments, the hydroxyaryl-terminated polysiloxane has two hydroxyaryl terminal groups, in which case in which case poly(arylene ether)-polysiloxane diblock and/or triblock copolymers are formed. It is also possible for the hydroxyaryl-terminated polysiloxane to have a branched structure that allows three or more hydroxyaryl terminal groups and the formation of corresponding branched copolymers.

As noted above, the polysiloxane block comprises, on average, 35 to 80 siloxane repeating units. Within this range, the number of siloxane repeating units can be 35 to 60, more specifically 40 to 50. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxylaryl-terminate polysiloxane molecule can be determined by NMR methods that compare the intensity of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

The thermoplastic composition comprises 1 to 8 weight percent siloxane repeating units and 12 to 99 weight percent arylene ether repeating units, based on the total weight of the thermoplastic composition. Within these ranges, the weight percent of siloxane repeating units can be 2 to 7 weight percent, specifically 3 to 6 weight percent, more specifically 4 to 5 weight percent; and the weight percent arylene ether repeating units can be 50 to 98 weight percent, specifically 70 to 97 weight percent, more specifically 90 to 96 weight percent.

As mentioned above, the thermoplastic composition is the product of a process comprising oxidatively copolymerizing a monomer mixture comprising a monohydric phenol and a hydroxyaryl-terminated polysiloxane. As such, the thermoplastic composition is made by a process that is simpler than poly(arylene ether)-polysiloxane block copolymer synthesis methods that require the coupling of pre-formed poly(arylene ether) and polysiloxane blocks.

The thermoplastic composition has a weight average molecular weight of at least 30,000 atomic mass units. In some embodiments the weight average molecular weight is 30,000 to 150,000 atomic mass units, specifically 35,000 to 120,000 atomic mass units, more specifically 40,000 to 90,000 atomic mass units, even more specifically 45,000 to 70,000 atomic mass units. In some embodiments, the thermoplastic composition has a number average molecular weight of 10,000 to 50,000 atomic mass units, specifically 10,000 to 30,000 atomic mass units, more specifically 14,000 to 24,000 atomic mass units. A detailed chromatographic method for determining molecular weight is described in the working examples below.

The thermoplastic composition can also include relatively small amounts of very low molecular weight species. Thus, in some embodiments, the thermoplastic composition comprises less than 25 weight percent of molecules having a molecular weight less than 10,000 atomic mass units, specifically 5 to 25 weight percent of molecules having a molecular weight less than 10,000 atomic mass units, more specifically 7 to 21 weight percent of molecules having a molecular weight less than 10,000 atomic mass units. In some embodiments, the molecules having a molecular weight less than 10,000 atomic mass units comprise, on average, 5 to 10 weight percent siloxane repeating units, specifically 6 to 9 weight percent siloxane repeating units.

Similarly, the thermoplastic composition can also include relatively small amounts of very high molecular weight species. Thus, in some embodiments, the thermoplastic composition comprises less than 25 weight percent of molecules having a molecular weight greater than 100,000 atomic mass units, specifically 5 to 25 weight percent of molecules having a molecular weight greater than 100,000 atomic mass units, more specifically 7 to 23 weight percent of molecules having a molecular weight greater than 100,000 atomic mass units. In some embodiments, the molecules having a molecular weight greater than 100,000 atomic mass units comprise, on average, 3 to 6 weight percent siloxane repeating units, specifically 4 to 5 weight percent siloxane repeating units.

In some embodiments, the thermoplastic composition has an intrinsic viscosity of at least 0.3 deciliter per gram, as measured at 25° C. in chloroform. The intrinsic viscosity can be 0.3 to 0.6 deciliter pre gram, specifically 0.3 to 0.5 deciliter per gram, still more specifically 0.31 to 0.55 deciliter per gram, yet more specifically 0.35 to 0.47 deciliter per gram.

One indication of the efficiency with which the hydroxyaryl-terminated polysiloxane is incorporated into block copolymer is the low concentration of so-called poly (arylene ether) "tail" groups. In a homopolymerization of 2,6-dimethylphenol, a large fraction of product molecules have a so-called head-to-tail structure in which the linear product molecule is terminated on one end by a 3,5-dimethyl-4-hydroxyphenyl "head" and on the other end by a 2,6-dimethylphenoxy "tail". Thus, when the monohydric phenol consists of 2,6-dimethylphenol, the poly(arylene ether) tail group has the structure

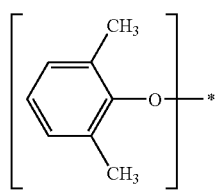

wherein the 3-, 4-, and 5-positions of the ring are substituted with hydrogen atoms. (that is, the term 2,6-dimethylphenoxy does not encompass divalent 2,6-dimethyl-1,4-phenylene ether groups). In a copolymerization of monohydric phenol with hydroxyaryl-terminated polysiloxane, incorporation of the hydroxyaryl-terminated polysiloxane into block copolymer will reduce the concentration of arylene ether "tail" groups. Thus, in some embodiments, the monohydric phenol consists of 2,6-dimethylphenol, and the thermoplastic composition of comprises less than or equal to 0.4 weight percent, specifically 0.2 to 0.4 weight percent, of 2,6-dimethylphenoxy groups, based on the weight of the thermoplastic composition.

The thermoplastic composition can further include groups derived from a diphenoquinone, which is itself an oxidation product of the monohydric phenol. For example, when the monohydric phenol is 2,6-dimethylphenol, the thermoplastic composition can comprise 1.1 to 2.0 weight percent of 2,6-dimethyl-4-(3,5-dimethyl-4-hydroxyphenyl)phenoxy groups.

The thermoplastic composition can be isolated from solution by an isolation procedure that minimizes volatile and nonvolatile contaminants. For example, in some embodiments, the thermoplastic composition comprises less than or equal to 1 weight percent of total volatiles, specifically 0.2 to 1 weight percent of total volatiles, determined according to the procedure in the working examples below. In some embodiments, the monomer mixture is oxidatively copolymerized in the presence of a catalyst comprising a metal (such as copper or manganese), and the thermoplastic composition comprises less than or equal to 100 parts per million by weight of the metal, specifically 5 to 100 parts per million by weight of the metal, more specifically 10 to 50 parts per million by weight of the metal, even more specifically 20 to 50 parts by weight of the metal.

The thermoplastic composition can be prepared by a method, comprising: oxidatively copolymerizing a monohydric phenol and a hydroxyaryl-terminated polysiloxane to form a thermoplastic composition; wherein the oxidative copolymerization is initiated in the presence of at least 50 weight percent of the hydroxyaryl-terminated polysiloxane and less than or equal to 50 weight percent of the monohydric phenol; wherein the oxidative copolymerization is conducted with a reaction time greater than or equal to 110 minutes; wherein the hydroxyaryl-terminated polysiloxane comprises, on average, 35 to 80 siloxane repeating units; and wherein the hydroxyaryl-terminated polysiloxane constitutes 1 to 8 weight percent of the combined weight of the monohydric phenol and the hydroxyaryl-terminated polysiloxane.

In some embodiments, the hydroxyaryl-terminated polysiloxane comprises, on average, 40 to 70 siloxane repeating units, specifically 40 to 60 siloxane repeating units, more specifically 40 to 50 siloxane repeating units.

As noted above, the hydroxyaryl-terminated polysiloxane constitutes 1 to 8 weight percent of the combined weight of the monohydric phenol and the hydroxyaryl-terminated polysiloxane. Within this range, the hydroxyaryl-terminated polysiloxane can constitute 2 to 7 weight percent, specifically 3 to 6 weight percent, more specifically 4 to 6 weight percent of the combined weight of the monohydric phenol and the hydroxyaryl-terminated polysiloxane.

In some embodiments, the oxidative copolymerization is initiated in the presence of at least 80 weight percent of the hydroxyaryl-terminated polysiloxane, specifically at least 90 weight percent of the hydroxyaryl-terminated polysiloxane, more specifically 100 weight percent of the hydroxyaryl-terminated polysiloxane.

In some embodiments, the oxidative copolymerization is initiated in the presence of 0 to 50 weight percent of the monohydric phenol, specifically 1 to 30 weight percent of the monohydric phenol, more specifically 2 to 20 weight percent of the monohydric phenol, even more specifically 5 to 10 weight percent of the monohydric phenol.

The oxidative copolymerization is conducted with a reaction time greater than or equal to 110 minutes. The reaction time is the elapsed time between initiation and termination of oxygen flow. (Although, for brevity, the description herein repeatedly refers to "oxygen" or "oxygen flow", it will be understood that any oxygen containing gas, including air, can be used as the oxygen source.) In some embodiments, the reaction time is 110 to 300 minutes, specifically 140 to 250 minutes, more specifically 170 to 220 minutes.

The oxidative copolymerization can include a "build time" which is the time between completion of monomer addition and termination of oxygen flow. In some embodiments, the reaction time comprises a build time of 80 to 160 minutes. In some embodiments, the reaction temperature during at least part of the build time can be 40 to 60° C., specifically 45 to 55° C.

After termination of the copolymerization reaction, the product thermoplastic composition can be isolated from solution using methods known in the art for isolating poly(arylene ether)s from solution. For example, the thermoplastic composition can be isolated by precipitation with an antisolvent, such as a $C_1$-$C_6$ alkanol, including methanol, ethanol, n-propanol, and isopropanol. The present inventors have observed that the use of isopropanol is advantageous because it is a good solvent for unreacted hydroxyaryl-terminated polysiloxane. Therefore, precipitation and washing with isopropanol substantially removes hydroxyaryl-terminated polysiloxane from the isolated product. As an alternative to precipitation, the thermoplastic composition can be isolated by direct isolation methods, including devolatilizing extrusion.

In some embodiments, the thermoplastic composition comprises 1 to 8 weight percent siloxane repeating units and 12 to 99 weight percent arylene ether repeating units.

In some embodiments, the thermoplastic composition has a weight average molecular weight of at least 30,000 atomic mass units, specifically 30,000 to 150,000 atomic mass units, more specifically 35,000 to 120,000 atomic mass units, even more specifically 40,000 to 90,000 atomic mass units, yet more specifically 45,000 to 70,000 atomic mass units.

In some embodiments, the thermoplastic composition incorporates greater than 75 weight percent, of the hydroxyaryl-terminated polysiloxane starting material into the poly(arylene ether)-polysiloxane block copolymer. Specifically, the amount of hydroxyaryl-terminated polysiloxane incorporated into the poly(arylene ether)-polysiloxane block copolymer can be at least 80 weight percent, more specifically at least 85 weight percent, still more specifically at least 90 weight percent, yet more specifically at least 95 weight percent.

In a very specific embodiment of the method, the monohydric phenol is 2,6-dimethylphenol; the hydroxyaryl-terminated polysiloxane is a eugenol-capped polydimethylsiloxane comprising 35 to 60 dimethylsiloxane units; the oxidative copolymerization is initiated in the presence of at least 90 weight percent of the hydroxyaryl-terminated polysiloxane and 2 to 20 weight percent of the monohydric phenol; the oxidative copolymerization is conducted with a reaction time of 170 to 220 minutes; and the hydroxyaryl-terminated polysiloxane constitutes 2 to 7 weight percent of the combined weight of the monohydric phenol and the capped polysiloxane.

The invention includes a thermoplastic composition prepared by any of the above-described methods. Thus, one embodiment is a thermoplastic composition prepared by a method, comprising: oxidatively copolymerizing a monohydric phenol and a hydroxyaryl-terminated polysiloxane to form a thermoplastic composition; wherein the oxidative copolymerization is initiated in the presence of at least 50 weight percent of the hydroxyaryl-terminated polysiloxane and less than or equal to 50 weight percent of the monohydric phenol; wherein the oxidative copolymerization is conducted with a reaction time greater than or equal to 110 minutes; wherein the hydroxyaryl-terminated polysiloxane comprises, on average, 35 to 80 siloxane repeating units; and wherein the hydroxyaryl-terminated polysiloxane constitutes 1 to 8 weight percent of the combined weight of the monohydric phenol and the hydroxyaryl-terminated polysiloxane.

In some embodiments, the thermoplastic composition comprises 1 to 8 weight percent siloxane repeating units and 12 to 99 weight percent arylene ether repeating units.

In some embodiments, the thermoplastic composition has a weight average molecular weight of at least 30,000 atomic mass units.

In some embodiments, the thermoplastic composition incorporates greater than 75 weight percent of the hydroxyaryl-terminated polysiloxane into the poly(arylene ether)-polysiloxane block copolymer.

In a very specific embodiment, the monohydric phenol is 2,6-dimethylphenol; the monohydric phenol is 2,6-dimethylphenol; the hydroxyaryl-terminated polysiloxane is a eugenol-capped polydimethylsiloxane comprising 35 to 60 dimethylsiloxane units; the oxidative copolymerization is initiated in the presence of at least 90 weight percent of the hydroxyaryl-terminated polysiloxane and 2 to 20 weight percent of the monohydric phenol; the oxidative copolymerization is conducted with a reaction time of 170 to 220 minutes; and the hydroxyaryl-terminated polysiloxane constitutes 2 to 7 weight percent of the combined weight of the monohydric phenol and the capped polysiloxane.

The invention includes at least the following embodiments.

Embodiment 1. A thermoplastic composition, comprising: a poly(arylene ether); and a poly(arylene ether)-polysiloxane block copolymer comprising a poly(arylene ether) block, and a polysiloxane block comprising, on average, 35 to 80 siloxane repeating units; wherein the thermoplastic composition comprises 1 to 8 weight percent siloxane repeating units and 12 to 99 weight percent arylene ether repeating units; wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of at least 30,000 atomic mass units.

Embodiment 2. The thermoplastic composition of embodiment 1, wherein the thermoplastic composition has a weight average molecular weight of 30,000 to 150,000 atomic mass units.

Embodiment 3. The thermoplastic composition of embodiment 1 or 2, wherein the thermoplastic composition has an intrinsic viscosity of at least 0.3 as measured at 25° C. in chloroform.

Embodiment 4. The thermoplastic composition of any of embodiments 1-3, wherein the thermoplastic composition has an intrinsic viscosity of 0.3 to 0.6 deciliter per gram as measured at 25° C. in chloroform.

Embodiment 5 The thermoplastic composition of any of embodiments 1-4, wherein the thermoplastic composition comprises less than 25 weight percent of molecules having a molecular weight less than 10,000 atomic mass units.

Embodiment 6. The thermoplastic composition of embodiment 5, wherein the molecules having a molecular weight less than 10,000 atomic mass units comprise, on average, 5 to 10 weight percent siloxane repeating units.

Embodiment 7. The thermoplastic composition of any of embodiments 1-6, wherein the thermoplastic composition comprises less than 25 weight percent of molecules having a molecular weight greater than 100,000 atomic mass units.

Embodiment 8. The thermoplastic composition of embodiment 7, wherein the molecules having a molecular weight greater than 100,000 atomic mass units comprise, on average, 3 to 6 weight percent siloxane repeating units.

Embodiment 9. The thermoplastic composition of any of embodiments 1-4, wherein the thermoplastic composition comprises less than 25 weight percent of molecules having a molecular weight less than 10,000 atomic mass units; wherein the molecules having a molecular weight less than 10,000 atomic mass units comprise, on average, 5 to 10 weight percent siloxane repeating units; wherein the thermoplastic composition comprises less than 25 weight percent of molecules having a molecular weight greater than 100,000 atomic mass units; and wherein the molecules having a molecular weight greater than 100,000 atomic mass units comprise, on average, 3 to 6 weight percent siloxane repeating units.

Embodiment 10. The thermoplastic composition of any of embodiments 1-9, wherein the hydroxyaryl-terminated polysiloxane comprises 35 to 60 siloxane repeating units.

Embodiment 11. The thermoplastic composition of any of embodiments 1-10, wherein the hydroxyaryl-terminated polysiloxane comprises 40 to 50 siloxane repeating units.

Embodiment 12. The thermoplastic composition of any of embodiments 1-11, wherein the monohydric phenol consists of 2,6-dimethylphenol, and wherein the thermoplastic composition comprises less than or equal to 0.4 weight percent of 2,6-dimethylphenoxy groups.

Embodiment 13. The thermoplastic composition of any of embodiments 1-12, wherein the monohydric phenol consists of 2,6-dimethylphenol, and wherein the thermoplastic composition comprises 0.2 to 0.4 weight percent of 2,6-dimethylphenoxy groups.

Embodiment 14. The thermoplastic composition of any of embodiments 1-13, wherein the poly(arylene ether) block comprises arylene ether repeating units having the structure

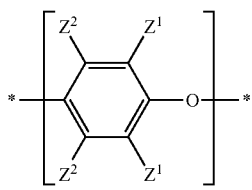

wherein for each repeating unit, each $Z^1$ is independently halogen, unsubstituted or substituted $C_1$-$C_{12}$ hydrocarbyl

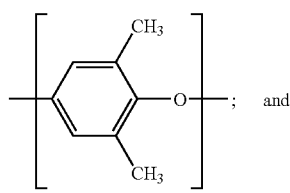

wherein the polysiloxane block has the structure

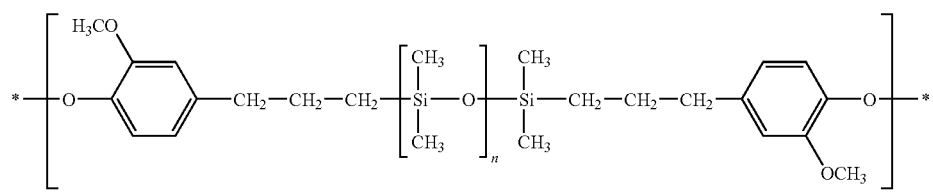

wherein n is 35 to 60; and wherein the thermoplastic composition has a number average molecular weight of 10,000 to 30,000 atomic mass units.

Embodiment 16. A method of preparing a thermoplastic composition, comprising: oxidatively copolymerizing a monohydric phenol and a hydroxyaryl-terminated polysiloxane to form a thermoplastic composition; wherein the oxidative copolymerization is initiated in the presence of at least 50 weight percent of the hydroxyaryl-terminated polysiloxane and less than or equal to 50 weight percent of the monohydric phenol; wherein the oxidative copolymerization is conducted with a reaction time greater than or equal to 110 minutes; wherein the hydroxyaryl-terminated polysiloxane comprises, on average, 35 to 80 siloxane repeating units; and wherein the hydroxyaryl-terminated polysiloxane constitutes 1 to 8 weight percent of the combined weight of the monohydric phenol and the hydroxyaryl-terminated polysiloxane.

Embodiment 17. The method of embodiment 16, wherein the thermoplastic composition comprises 1 to 8 weight percent siloxane repeating units and 12 to 99 weight percent arylene ether repeating units.

Embodiment 18. The method of embodiment 16 or 17, wherein the thermoplastic composition has a weight average molecular weight of at least 30,000 mass units.

Embodiment 19. The method of any of embodiments 16-18, wherein the thermoplastic composition incorporates greater than 75 weight percent of the hydroxyaryl-terminated polysiloxane into the poly(arylene ether)-polysiloxane block copolymer.

Embodiment 20. The method of any of embodiments 16-19, wherein the monohydric phenol is 2,6-dimethylphenol; wherein the hydroxyaryl-terminated polysiloxane is a eugenol-capped polydimethylsiloxane comprising 35 to 60 dimethylsiloxane units; wherein the oxidative copolymerization is initiated in the presence of at least 90 weight percent of the hydroxyaryl-terminated polysiloxane and 2 to 20 weight percent of the monohydric phenol; wherein the oxidative copolymerization is conducted with a reaction time of 170 to 220 minutes; and wherein the hydroxyaryl-terminated polysiloxane constitutes 2 to 7 weight percent of the combined weight of the monohydric phenol and the capped polysiloxane.

provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom;

wherein the polysiloxane block comprises repeating units having the structure

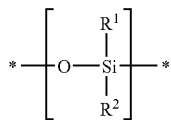

wherein each occurrence of $R^1$ and $R^2$ is independently hydrogen, $C_1$-$C_{12}$ hydrocarbyl or $C_1$-$C_{12}$ halohydrocarbyl; and wherein the polysiloxane block further comprises a terminal unit having the structure

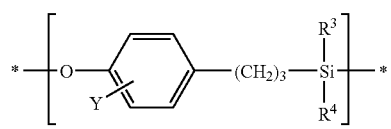

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl.

Embodiment 15. The thermoplastic composition of any of embodiments 1-14, wherein the poly(arylene ether) block comprises arylene ether repeating units having the structure Embodiment 21. A thermoplastic composition prepared by a method, comprising: oxidatively copolymerizing a monohydric phenol and a hydroxyaryl-terminated polysiloxane to form a thermoplastic composition; wherein the oxidative copolymerization is initiated in the presence of at least 50 weight percent of the hydroxyaryl-terminated polysiloxane and less than or equal to 50 weight percent of the monohydric phenol; wherein the oxidative copolymerization is conducted with a reaction time greater than or equal to 110 minutes; wherein the hydroxyaryl-terminated polysiloxane comprises, on average, 35 to 80 siloxane repeating units; and wherein the hydroxyaryl-terminated polysiloxane constitutes 1 to 8 weight percent of the combined weight of the monohydric phenol and the hydroxyaryl-terminated polysiloxane.

Embodiment 22. The thermoplastic composition of embodiment 21, wherein the reaction time comprises a build time of 80 to 160 minutes.

Embodiment 23. The thermoplastic composition of embodiment 21 or 22, wherein the thermoplastic composition comprises 1 to 8 weight percent siloxane repeating units and 12 to 99 weight percent arylene ether repeating units.

Embodiment 24. The thermoplastic composition of any of embodiments 21-23, wherein the thermoplastic composition has a weight average molecular weight of at least 30,000 atomic mass units.

Embodiment 25. The thermoplastic composition of any of embodiments 21-24, wherein the thermoplastic composition incorporates greater than 75 weight percent of the hydroxyaryl-terminated polysiloxane into the poly(arylene ether)-polysiloxane block copolymer.

Embodiment 26. The thermoplastic composition of any of embodiments 21-25, wherein the monohydric phenol is 2,6-dimethylphenol; wherein the hydroxyaryl-terminated polysiloxane is a eugenol-capped polydimethylsiloxane comprising 35 to 60 dimethylsiloxane units; wherein the oxidative copolymerization is initiated in the presence of at least 90 weight percent of the hydroxyaryl-terminated polysiloxane and 2 to 20 weight percent of the monohydric phenol; wherein the oxidative copolymerization is conducted with a reaction time of 170 to 220 minutes; and wherein the hydroxyaryl-terminated polysiloxane constitutes 2 to 7 weight percent of the combined weight of the monohydric phenol and the capped polysiloxane.

The invention is further illustrated by the following non-limiting examples.

EXAMPLES 1-10

COMPARATIVE EXAMPLES 1-7

These examples, which were conducted on a laboratory scale, illustrate the effects of several process variables on product characteristics.

The following materials were used in the block copolymer synthesis: 2,6-dimethylphenol was obtained from SABIC Innovative Plastics LLP; N,N-dimethyl-n-butylamine (DMBA), N,N'-di-tert-butyl-ethylenediamine (DBEDA), and di-n-butylamine (DBA) were obtained from Celanese Ltd.; Cuprous Oxide ($Cu_2O$) was obtained from American Chemet Corporation; a phase transfer agent was obtained as Maquat 4450T from Mason Chemical Company; hydrobromic acid (HBr) was obtained from Diaz Chemical Corporation; toluene was obtained from Ashland; trisodium nitrilotriacetate (NTA) was obtained from Akzo Nobel Functional Chemicals LLC; eugenol-capped siloxane fluids were obtained from Momentive Performance Materials.

Component amounts for a representative reaction mixture are given in Table 1, where the flow rate units of standard cubic centimeters per minute are abbreviated "sccm", and the agitator speed units of rotations per minute are abbreviated "rpm".

TABLE 1

| | Amount | Relative Amount |
|---|---|---|
| Toluene, initially present in reactor | 605 grams | |
| Eugenol-capped siloxane, initially present in reactor | variable (See Table 2) | |
| 50% 2,6-dimethylphenol in toluene, added to reactor before initiation of $O_2$ flow | 47 grams | 7.9% of total 2,6-dimethylphenol |
| 50% 2,6-dimethylphenol in toluene, gradually added to reactor after initiation of $O_2$ flow | 553 grams | 92.1% of total 2,6-dimethylphenol |
| DBA, added to reactor before initiation of $O_2$ flow | 3.00 grams | 1% based on total monomer |
| DMBA, added to reactor before initiation of $O_2$ flow | 10.05 grams | 1% based on total toluene |
| Diamine Mix initially present in reactor | 0.474 grams DBEDA | 21% based on catalyst solution |
| | 0.0237 grams Maquat | |
| | 0.869 grams toluene | |
| Copper solution initially present in reactor | 0.16 grams $Cu_2O$ | 0.75% based on total monomer |
| | 2.09 grams 48% HBr (aq.) | 92.7% of total catalyst solution |
| Toluene rinse (hand-feed) | 100 grams | |
| Rate of monomer addition | 20 grams/minute | |
| $N_2$ Flow | 1200 sccm | |
| $O_2$ Flow | 700 sccm | |
| Agitator speed | 1000 rpm | |
| NTA/100 mL water | 1.78 grams | 1.2 mole NTA per mole Cu |

The process variations are summarized in Table 2, where "Toluene source" refers to whether the toluene solvent is fresh or recycled ("Recyc." in Table 2) from a poly(arylene ether) homopolymer synthesis; "DMBA level (%)" is the concentration of dimethyl-n-butylamine, expressed as a weight percent relative to the weight of toluene; "Solids (%)" is the weight of total 2,6-dimethylphenol and eugenol-capped polysiloxane, expressed as a weight percent relative to the sum of the weights of 2,6-dimethylphenol, eugenol-capped polysiloxane, and toluene; "Polysiloxane chain length" is the average number of dimethylsiloxane (—$Si(CH_3)_2O$—) units in the eugenol-capped polysiloxane; "Polysiloxane loading (%)" is the weight percent of eugenol-capped polysiloxane in the reaction mixture, based on the total weight of the eugenol-capped polysiloxane and the 2,6-dimethylphenol; "Initial 2,6-dimethylphenol (%)" is the weight percent of 2,6-dimethylphenol present in the reaction vessel at the initiation of polymerization (the introduction of oxygen to the reaction vessel), relative to the total weight of 2,6-dimethylphenol; "O:2,6-dimethylphenol mole ratio" is the mole ratio of atomic oxygen (provided as molecular oxygen) to 2,6-dimethylphenol maintained during the addition of 2,6-dimethylphenol; "Temp., initial charge (° C.)" is the temperature, in degrees centigrade, of the reaction mixture when the initial charge of monomer is added to the reaction vessel, and when oxygen is first introduced to the reaction mixture; "Temp., addition (° C.)" is the reaction temperature during further addition of 2,6-dimethylphenol; "Temp., build (° C.)" is the temperature, expressed in degrees centigrade, during the build phase of the reaction; "Ramp time (min)" is the time, expressed in minutes, during which the temperature was ramped from the addition temperature to the build temperature; "Ramp slope (° C./min)" is the rate of change of temperature, expressed in degrees centigrade per minute, during the period in which the temperature was ramped from the addition temperature to the build temperature; "Reaction time (min)" is the total reaction time, expressed in minutes, elapsed between the moment of oxygen introduction and the moment of oxygen cut-off, For all variations, controlled monomer addition time is 40 to 80 minutes from start of reaction (that is, the initiation of oxygen flow). Build time is measured from the end of controlled monomer addition to the end of reaction (that is, to the termination of oxygen flow); build time was varied between 80 and 160 minutes.

The process variations were superimposed on the following general synthetic procedure. The reactor was purged with nitrogen ($N_2$) via the dip tube later used for oxygen introduction. There is also a separate nitrogen inlet to adjust the nitrogen content in reactor. An addition pot was loaded with a 50 weight percent solution of 2,6-dimethylphenol in toluene, and the headspace of the addition funnel was purged with nitrogen. The temperatures of the addition pot and its contents were adjusted to 50° C. using an ethylene glycol bath. The reactor was washed with 60° C. toluene while the nitrogen purge of the reactor was continued. The reactor was charged with initial toluene, polymerization catalyst, and eugenol-capped polydimethylsiloxane via a side port. Monomer addition and oxygen addition were started and the temperature was maintained at the value shown in the Table 2 row labeled "Temp., addition (° C.)". Starting after complete addition of 2,6-dimethylphenol, the temperature of the reaction vessel was gradually raised to the value shown in the Table 2 row labeled "Temp., build (° C.)". This temperature adjustment occurred over the time span indicated in the Table 2 row labeled "Ramp time (min)" and at the rate indicated in the Table 2 row labeled "Ramp slope (° C./min)". During the temperature adjustment phase and the constant temperature phase that followed, the oxygen flow was adjusted (typically, reduced) as necessary to maintain a headspace oxygen concentration of 18%. The reaction was continued until a desired time point was reached. This time point is predetermined with other experiments and is intended to ensure maximum siloxane incorporation and target intrinsic viscosity and is generally 80 to 160 minutes after complete addition of 2,6-dimethylphenol. Once this time point was reached, the oxygen flow was stopped. The reaction mixture and headspace are then purged with nitrogen. The total reaction time is the time elapsed between initiation and termination of oxygen flow. The reaction mixture is transferred to a glass vessel for chelation and separation of the polymerization catalyst. The chelation step utilizes 1.2 moles of trisodium nitrilotriacetate per mole of copper ion, where the trisodium nitrilotriacetate is provided as a 40 weight percent solution in water. The combined reaction mixture and chelant solution were stirred and maintained at 60° C. for one hour. The mixture is then phase separated using a separatory funnel or a liquid/liquid centrifuge to yield a heavy (aqueous) fraction that was discarded and a light (organic) fraction containing the block copolymer product. Use of the chelant solution typically results in a product having a residual catalyst metal concentration of 1 to 50 parts per million by weight, specifically 1 to 20 parts by million by weight, based on the dry weight of the isolated powder. The product was isolated via precipitation with methanol or isopropanol in a weight ratio of polymer solution to alcohol of 1:2 to 1:3, followed by filtration and drying of the filtrate under partial vacuum with nitrogen bleed at 110° C. overnight. The final powder typically has a residual solvent (e.g., toluene) concentration of 50 parts per million by weight to 1 weight percent. For product analysis, all samples were precipitated with isopropanol, except for Comparative Example 1, which was precipitated with methanol.

Number average molecular weight and weight average molecular weight were determined by gel permeation chromatography as follows. The gel permeation chromatograph is calibrated using eight polystyrene standards, each of narrow molecular weight distribution, and collectively spanning a molecular weight range of 3,000 to 1,000,000 grams/mole. The columns used were 1e3 and 1e5 angstrom Plgel columns with a 5 microliter 100 angstrom PLgel guard column. Chromatography was conducted at 25° C. The elution liquid was chloroform with 100 parts per million by weight di-n-butylamine. The elution flow was 1.2 milliliters per minute. The detector wavelength was 254 nanometers. A third degree polynomial function is fitted through the calibration points. Experimental samples are prepared by dissolving 0.27 grams isolated block copolymer solid in 45 milliliters toluene. A 50 microliter sample of the resulting solution is injected into the chromatograph. The values of number average molecular weight ($M_n$) and weight average molecular weight ($M_w$) are calculated from the measured signal using the polystyrene calibration line. The values are subsequently converted from polystyrene molecular weight to poly(2,6-dimethyl-1,4-phenylene ether) molecular weights using the formula: $M(PPE)=0.3122 \times M(PS)^{1.073}$, where M(PPE) is poly(2,6-dimethyl-1,4-phenylene ether) molecular weight and M(PS) is polystyrene molecular weight.

Reaction conditions and properties of resulting products are summarized in Table 2. For the product properties in Table 2, "Mol. Wt.<10K (%)" is the weight percent of the isolated product having a molecular weight less than 10,000 atomic mass units, as determined by gel permeation chromatography; "Mol. Wt.>100K (%)" is the weight percent of the isolated product having a molecular weight greater than 10,000 atomic mass units, as determined by gel permeation chromatography; "IV, end of rxn. (dL/g)" is the intrinsic viscosity, expressed in deciliters per gram and measured by Ubbelohde viscometer at 25° C. in chloroform, of dried powder isolated by precipitation from isopropanol; "IV, end of cheln. (dL/g)" expressed in deciliters per gram and measured by Ubbelohde viscometer at 25° C. in chloroform, of the product present in the post-chelation organic phase which has been isolated by precipitation from isopropanol then dried; "$M_w$, end of rxn. (AMU)" is the weight average molecular weight, expressed in atomic mass units and measured by gel permeation chromatography, of the product present in the reaction mixture at the end of the polymerization reaction which has been isolated by precipitation from isopropanol then dried; "$M_n$, end of rxn. (AMU)" is the number average molecular weight, expressed in atomic mass units and measured by gel permeation chromatography, of the product present in the reaction mixture at the end of the polymerization reaction which has been isolated by precipitation from isopropanol then dried; "$M_w/M_n$, end of rxn." is the ratio of weight average molecular weight to number average molecular weight for the product present in the reaction mixture at the end of the polymerization reaction which has been isolated by precipitation from isopropanol then dried; "$M_w$, end of cheln. (AMU)" is the weight average molecular weight, expressed in atomic mass units and measured by gel permeation chromatography, of the product present in the post-chelation organic phase which has been isolated by precipitation from isopropanol then dried; "$M_n$, end of cheln. (AMU)" is the number average molecular weight, expressed in atomic mass units and measured by gel permeation chromatography, of the product present in the post-chelation organic phase which has been isolated by precipitation from isopropanol then dried; "$M_w/M_n$, end of cheln." is the ratio of weight average molecular weight to number average molecular weight for the product present in the post-chelation organic phase which has been isolated by precipitation from isopropanol then dried.

In Table 2, "Weight % siloxane (%)" is the weight percent of dimethylsiloxane units in the isolated product, based on the total weight of 2,6-dimethyl-1,4-phenylene ether units and dimethylsiloxane units in the isolated product, as determined by $^1$H NMR using protons labeled a and b in the structure labeled "Formula I", below, and calculated as $$\text{Weight \% Siloxane\_in\_product} = \frac{X}{X+Y} \times 100$$

where $$X = \frac{\text{Peak ``}b\text{'' Integral@0.6 ppm} \times \text{Mn Siloxane Fluid}}{\text{proton per Siloxane Chain}}, \text{and}$$

$$Y = \frac{\text{Peak ``}a\text{'' Integral@6.47 ppm} \times \text{MW 2,6 xylenol}}{2}$$

where "Mn Siloxane Fluid" in the equation for X is the number average molecular weight of the dimethylsiloxane units in the hydroxyaryl-terminated polysiloxane, and "MW 2,6xylenol" in the equation for Y is the molecular weight of 2,6-dimethylphenol. Calling this metric "Weight % siloxane" is an oversimplification in that it neglects isolated product constituents other than the 2,6-dimethyl-1,4-phenylene ether units and dimethylsiloxane units. Nevertheless, it is a useful metric.

In Table 2, "Siloxane Incorporation Efficiency (%)" is the weight percent of dimethylsiloxane units in the isolated product compared to the weight percent of dimethylsiloxane units in the total monomer composition used in the reaction mixture (the precipitation from isopropanol removes unreacted (unincorporated) siloxane macromer), as determined by $^1$H NMR using protons labeled a and b in the structure labeled "Formula I", and calculated as $$\text{Siloxane\_Incorporation\_Efficiency\_(\%)} = \frac{\frac{\text{Weight \% Siloxane\_in\_product}}{\text{\% Siloxane Loaded}} \times 100}{}$$

where the equation for Weight % Siloxane_in_product is given above, and $\text{\% Siloxane Loaded} = \frac{\text{Weight of Siloxane Monomer Loaded}}{\text{Weight of Siloxane Monomer Loaded +}} \times 100$ Weight of 2,6 Monomer Loaded where "Weight of Siloxane Monomer Loaded" is the weight of hydroxyaryl-terminated polysiloxane used in the reaction mixture, and "Weight of 2,6 Monomer Loaded" is the total weight of 2,6-dimethylphenol used in the reaction mixture. Calling this metric "Siloxane Incorporation Efficiency" is an oversimplification in that it neglects the possibility that small amounts of monomers and oligomers may be lost in the isolation process. For example, it is theoretically possible for the Siloxane Incorporation Efficiency to exceed 100% if all of the hydroxyaryl-terminated polysiloxane is incorporated into block copolymer, and some arylene ether oligomers are lost in the isolation procedure. Nevertheless, Siloxane Incorporation Efficiency is a useful metric.

In Table 2, "Tail (%)" refers to the percent of 2,6-dimethylphenol that are in an end group configuration compared to total 2,6-dimethylphenol residues and is determined by $^1$H NMR using the "tail" protons labeled e in the structure labeled "Formula (III)" below, and the protons labeled a in the structure labeled "Formula (I)" below, and calculated as $$\text{\% Tail} = \frac{Z}{Z+Y} \times 100$$

where the equation for Y is above, and $$Z = \frac{\text{Peak ``}e\text{'' Integral@7.09 ppm} \times \text{MW of 2,6 xylenol}}{3}$$

In Table 2, "Biphenyl (%)" is the weight percent of 3,3',5,5'-tetramethyl-4,4'-biphenol residues, that is, residues having the structure

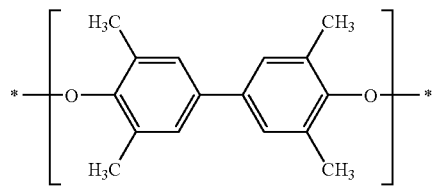

and is determined by $^1$H NMR using the "biphenyl" protons labeled d in the structure labeled "Formula (II)", below, and the protons labeled a in the structure labeled "Formula (I)", and calculated as $$\text{\% Biphenyl} = \frac{W}{W+Y} \times 100$$

where the equation for Y is above, and $$W = \frac{\text{Peak ``}d\text{'' Integral@7.35 ppm} \times \text{MW biphenyl}}{4}$$

wherein "MW biphenyl" is the molecular weight of the residue of 3,3',5,5'-tetramethyl-4,4'-biphenol shown above.

"OH (ppm)" is the parts per million by weight of all hydroxyl groups, based on the total weight of the isolated sample, as determined by $^{31}$P NMR after phosphorus derivatization of the hydroxyl groups of the isolated sample as described in K. P. Chan et al., "Facile Quantitative Analysis of Hydroxyl End Groups of Poly(2,6-dimethyl-1,4-phenylene oxide)s by $^{31}$P NMR Spectroscopy", Macromolecules, volume 27, pages 6371-6375 (1994).

Formula (I):

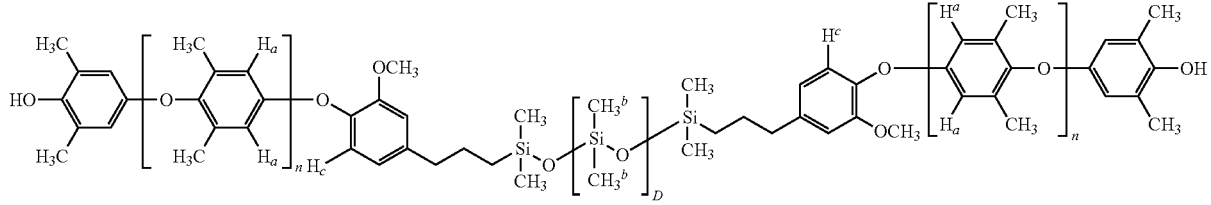

Formula (II):

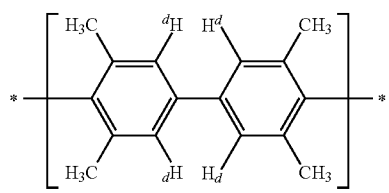

Formula (III):

The results show Examples 1-10, using hydroxyaryl-terminated polysiloxanes of moderate chain length, low concentrations of hydroxyaryl-terminated polysiloxane, gradual addition of phenolic monomer, and extended reaction times, all exhibit siloxane incorporation efficiencies of 91 to 102 percent. In contrast, Comparative Examples 1-7, each using at least one of an excessive polysiloxane chain length, a high concentration of hydroxyaryl-terminated polysiloxane, bulk addition of phenolic monomer, and inadequate reaction times, exhibit siloxane incorporation efficiencies of 26 to 72 percent.

TABLE 2

|  | C. Ex. 1 | C. Ex. 2 | C. Ex. 3 | C. Ex. 4 | C. Ex. 5 | Ex. 1 |
|---|---|---|---|---|---|---|
| Toluene Source | Fresh | Fresh | Fresh | Fresh | Fresh | Fresh |
| DMBA level (%) | 1 | 1 | 1 | 2 | 1 | 1 |
| Solids (%) | 23 | 23 | 23 | 23 | 23 | 23 |
| Polysiloxane chain length | 45 | 45 | 45 | 45 | 45 | 45 |
| Polysiloxane loading (%) | 20 | 20 | 20 | 20 | 10 | 5 |
| Initial 2,6-DMP (%) | 100 | 7.9 | 7.9 | 7.9 | 7.9 | 7.9 |
| O:2,6-DMP mole ratio | NA | 0.98 | 0.98 | 0.98 | 0.98 | 0.98 |
| Catalyst (%) | 0.75 | 0.75 | 0.75 | 1.5 | 0.75 | 0.75 |
| Temp., initial charge (° C.) | 30 | 30 | 30 | 30 | 30 | 30 |
| Temp., addition (° C.) | 30 | 30 | 30 | 30 | 30 | 30 |
| Temp., build (° C.) | 49 | 49 | 49 | 49 | 49 | 49 |
| Ramp time (min) | 10 | 10 | 10 | 10 | 10 | 10 |
| Ramp slope (° C./min) | 1.9 | 1.9 | 1.9 | 1.9 | 1.9 | 1.9 |
| Reaction time (min) | 80 | 120 | 200 | 200 | 200 | 200 |
| Mol. Wt. <10K (%) | — | — | — | — | — | — |
| Mol. Wt. >100K (%) | — | — | — | — | — | — |
| IV, end of rxn. (dL/g) | — | — | — | — | — | — |
| IV, end of cheln. (dL/g) | 0.15 | 0.25 | 0.26 | 0.30 | 0.30 | 0.40 |
| $M_w$, end of rxn. (AMU) | — | — | — | — | — | — |
| $M_n$, end of rxn. (AMU) | — | — | — | — | — | — |
| $M_w/M_n$, end of rxn. | — | — | — | — | — | — |
| $M_w$, end of cheln. (AMU) | 21000 | 23000 | 25000 | 32000 | 34000 | 51000 |
| $M_n$, end of cheln. (AMU) | 9000 | 11000 | 11000 | 14000 | 14000 | 20000 |
| $M_w/M_n$, end of cheln. | 2.3 | 2.1 | 2.3 | 2.3 | 2.4 | 2.6 |
| Weight % siloxane (%) | 9 | 11 | 11.8 | 14 | 5.52 | 4.8 |
| Siloxane Incorporation Efficiency (%) | 45 | 55 | 59 | 70 | 55 | 96 |
| Tail (%) | — | — | — | — | — | — |
| Biphenyl (%) | — | — | — | — | — | — |
| OH (ppm) | — | — | — | — | — | — |
|  | C. Ex. 6 | C. Ex. 7 | Ex. 2 | Ex. 3 | Ex. 4 | Ex. 5 |
| Toluene Source | Fresh | Fresh | Fresh | Recyc. | Recyc. | Recyc. |
| DMBA level (%) | 1 | 1 | 1 | 1.17 | 1.17 | 1.17 |
| Solids (%) | 23 | 23 | 23 | 23 | 23 | 23 |
| Polysiloxane chain length | 10 | 30 | 45 | 45 | 45 | 45 |
| Polysiloxane loading (%) | 20 | 20 | 5 | 5 | 5 | 5 |
| Initial 2,6-DMP (%) | 7.9 | 7.9 | 7.9 | 7.9 | 7.9 | 7.9 |
| O:2,6-DMP mole ratio | 0.98 | 0.98 | 0.7 | 0.98 | 0.98 | 0.98 |
| Catalyst (%) | 0.75 | 0.75 | 0.75 | 0.75 | 0.75 | 0.75 |
| Temp., initial charge (° C.) | 30 | 30 | 30 | 21 | 21 | 21 |
| Temp., addition (° C.) | 30 | 30 | 30 | 38 | 38 | 38 |

TABLE 2-continued

|  |  |  |  |  |  |  |
|---|---|---|---|---|---|---|
| Temp., build (° C.) | 49 | 49 | 49 | 49 | 49 | 49 |
| Ramp time (min) | 10 | 10 | 10 | 10 | 30 | 5 |
| Ramp slope (° C./min) | 1.9 | 1.9 | 1.9 | 1.1 | 0.37 | 2.2 |
| Reaction time (min) | 200 | 200 | 180 | 180 | 180 | 180 |
| Mol. Wt. <10K (%) | — | — | 13 | 21 | 13 | 11 |
| Mol. Wt. >100K (%) | — | — | 10 | 7 | 10 | 11 |
| IV, end of rxn. (dL/g) | — | — | 0.36 | 0.46 | 0.42 | 0.42 |
| IV, end of cheln. (dL/g) | 0.15 | 0.25 | 0.34 | 0.28 | 0.31 | 0.33 |
| $M_w$, end of rxn. (AMU) | — | — | 55000 | 64000 | 58000 | 61000 |
| $M_n$, end of rxn. (AMU) | — | — | 21000 | 24000 | 23000 | 23000 |
| $M_w/M_n$, end of rxn. | — | — | 2.6 | 2.7 | 2.5 | 2.7 |
| $M_w$, end of cheln. (AMU) | 7900 | 31000 | 47000 | 37000 | 44000 | 44000 |
| $M_n$, end of cheln. (AMU) | 4600 | 15000 | 19000 | 14000 | 17000 | 16000 |
| $M_w/M_n$, end of cheln. | 1.7 | 2.1 | 2.5 | 2.6 | 2.6 | 2.8 |
| Weight % siloxane (%) | 5.2 | 14.4 | 4.6 | 4.9 | 4.8 | 5 |
| Siloxane Incorporation Efficiency (%) | 26 | 72 | 92 | 98 | 96 | 100 |
| Tail (%) | — | — | 0.37 | — | — | — |
| Biphenyl (%) | — | — | 1.5 | 2.0 | 1.6 | 1.6 |
| OH (ppm) | — | — | 1576 | — | — | — |

|  | Ex. 6 | Ex. 7 | Ex. 8 | Ex. 9 | Ex. 10 |
|---|---|---|---|---|---|
| Toluene Source | Recyc. | Recyc. | Fresh | Fresh | Recyc. |
| DMBA level (%) | 1.2 | 1.2 | 1 | 1 | 1.2 |
| Solids (%) | 23 | 23 | 23 | 23 | 23 |
| Polysiloxane chain length | 45 | 45 | 45 | 45 | 45 |
| Polysiloxane loading (%) | 5 | 5 | 5 | 5 | 5 |
| Initial 2,6-DMP (%) | 7.9 | 7.9 | 7.9 | 7.9 | 7.9 |
| O:2,6-DMP mole ratio | 0.98 | 0.98 | 0.98 | 0.98 | 0.98 |
| Catalyst (%) | 0.75 | 0.75 | 0.75 | 0.75 | 0.94 |
| Temp., initial charge (° C.) | 21 | 21 | 21 | 21 | 21 |
| Temp., addition (° C.) | 30 | 30 | 30 | 38 | 38 |
| Temp., build (° C.) | 49 | 49 | 49 | 49 | 49 |
| Ramp time (min) | 10 | 30 | 30 | 30 | 30 |
| Ramp slope (° C./min) | 1.9 | 0.63 | 0.63 | 0.37 | 0.37 |
| Reaction time (min) | 180 | 180 | 180 | 180 | 150 |
| Mol. Wt. <10K (%) | 16 | 16 | 11 | 13 | 16 |
| Mol. Wt. >100K (%) | 8 | 8 | 16 | 13 | 16 |
| IV, end of rxn. (dL/g) | 0.41 | 0.45 | 0.55 | 0.46 | 0.47 |
| IV, end of cheln. (dL/g) | 0.32 | 0.31 | 0.41 | 0.37 | 0.39 |
| $M_w$, end of rxn. (AMU) | 58000 | 64000 | 81000 | 68000 | 111000 |
| $M_n$, end of rxn. (AMU) | 21000 | 23000 | 30000 | 26000 | 39000 |
| $M_w/M_n$, end of rxn. | 2.8 | 2.8 | 2.7 | 2.6 | 2.8 |
| $M_w$, end of cheln. (AMU) | 41000 | 41000 | 57000 | 51000 | 54000 |
| $M_n$, end of cheln. (AMU) | 16000 | 16000 | 21000 | 19000 | 16000 |
| $M_w/M_n$, end of cheln. | 2.6 | 2.6 | 2.7 | 2.7 | 3.4 |
| Weight % siloxane (%) | 4.7 | 4.7 | 4.60 | 4.7 | 4.56 |
| Siloxane Incorporation Efficiency (%) | 94 | 94 | 92 | 94 | 91 |
| Tail (%) | 0.27 | 0.25 | 0.25 | 0.26 | 0.21 |
| Biphenyl (%) | 1.6 | 1.6 | 1.3 | 1.35 | 1.68 |
| OH (ppm) | 1914 | 1897 | 1339 | — | — |

EXAMPLES 11-17

These examples, which were conducted on a pilot plant scale, illustrate the effects of several process variables on the product characteristics of the block copolymer product.

The process variations are summarized in Table 3 and are the same as those described above for Table 2.

The process variations were superimposed on the following general synthetic procedure. The reactor and the 2,6-dimethylphenol addition tank were rinsed with warm toluene to assure their cleanliness. The reaction was purged with nitrogen to achieve an oxygen concentration of less than 1%. The reactor was charged with initial toluene (fresh or recycled), and this toluene was stirred at 500 rotations per minute (rpm). The temperature of the initial toluene was adjusted to the "initial charge" temperature specified in Table 2 and maintained at that temperature during addition of the initial charge of 2,6-dimethylphenol from the addition tank to the reaction vessel. After the addition of the initial charge of 2,6-dimethylphenol was complete, the reaction vessel was charged with the eugenol-capped polydimethylsiloxane, the di-n-butylamine, the dimethyl-n-butylamine, the diamine, and the copper catalyst. Oxygen flow and further monomer addition were initiated, and the oxygen flow was regulated to maintain a head space concentration less than 17%. During further monomer addition, cooling water supply temperature was adjusted to maintain the temperature specified as "Temp., addition (° C.)" in Table 3. After monomer addition was complete, the monomer addition line was flushed with toluene and the reaction temperature was increased to the temperature specified as "Temp., build (° C.)" in Table 3. This temperature adjustment was conducted over the time period specified as "Ramp time (min)", and at the rate specified as "Ramp slope (° C./min)" in Table 3. The reaction was continued until a pre-determined time point is reached. The pre-determined end point is the time at which target intrinsic viscosity and maximum siloxane incorporation are attained and is typically 80 to 160 minutes after 2,6-dimethylphenyl addition ends. Once the time point reached, the oxygen flow was stopped. The reaction mixture was then heated to 60° C.

and pumped to a chelation tank containing aqueous chelant solution. The resulting mixture was stirred and held at 60° C. for one hour. The light (organic) and heavy (aqueous) phases were separated by decantation, and the heavy phase was discarded. A small portion of the light phase was sampled and precipitated with isopropanol for analysis, and the remainder of the light phase was pumped to a precipitation tank and combined with methanol antisolvent in a weight ratio of 3 parts antisolvent to 1 part light phase. The precipitate was filtered to form a wet cake, which was reslurried three times with the same antisolvent and dried under nitrogen until a toluene concentration less than 1 weight percent was obtained.

Reaction conditions and properties of resulting products are summarized in Table 3. "Total volatiles (%)", which is weight percent of volatiles in the isolated product, was determined by measuring the percent weight loss accompanying drying for 1 hour at 110° C. under vacuum; "Residual Cu (ppm)", which is the residual catalyst concentration expressed as parts per million by weight of elemental copper, was determined by atomic absorption spectroscopy; for properties as a function of reaction time, samples were removed from the reactor and precipitated (without prior chelation of catalyst metal) by addition of one volume of reaction mixture to three volumes of room temperature isopropanol to yield a precipitate that was filtered, washed with isopropanol, and dried prior to $^1$H NMR (to determine weight percent siloxane and siloxane incorporation efficiency) and intrinsic viscosity analyses.

The results in Table 3 show that long reaction times—much longer than those used for polymerization of monohydric phenol alone—are needed to achieve high siloxane incorporation efficiencies.

TABLE 3

|  | Ex. 11 | Ex. 12 | Ex. 13 | Ex. 14 |
|---|---|---|---|---|
| REACTION CONDITIONS | | | | |
| Toluene Source | Fresh | Fresh | Fresh | Recyc. |
| DMBA level (%) | 1 | 1 | 1.2 | 2.4 |
| Solids (%) | 23 | 23 | 23 | 23 |
| Polysiloxane chain length | 45 | 45 | 45 | 45 |
| Polysiloxane loading (%) | 5 | 5 | 5 | 5 |
| Initial 2,6-DMP (%) | 7.9 | 7.9 | 7.9 | 7.9 |
| O:2,6-DMP mole ratio | 0.98 | 0.98 | 0.98 | 0.98 |
| Catalyst (%) | 0.75 | 0.75 | 0.9 | 0.75 |
| Temp., initial charge (° C.) | 21 | 21 | 21 | 21 |
| Temp., addition (° C.) | 30 | 38 | 38 | 38 |
| Temp., build (° C.) | 49 | 49 | 49 | 49 |
| Ramp time (min) | 10 | 30 | 30 | 30 |
| Ramp slope (° C./min) | 1.9 | 0.37 | 0.37 | 0.37 |
| Reaction time (min) | 200 | 200 | 200 | 200 |
| FINAL PRODUCT PROPERTIES | | | | |
| Mol. Wt. <10K (%) | 12 | 7 | 10 | 12 |
| Mol. Wt. >100K (%) | 9 | 12 | 23 | 12 |
| IV, end of rxn. (dL/g) | 0.33 | 0.36 | 0.53 | 0.40 |
| IV, end of cheln. (dL/g) | 0.31 | 0.35 | 0.47 | 0.36 |
| $M_w$, end of rxn. (AMU) | 45000 | 51000 | 78000 | 58000 |
| $M_n$, end of rxn. (AMU) | 19000 | 20000 | 27000 | 24000 |
| $M_w/M_n$, end of rxn. | 2.4 | 2.6 | 2.9 | 2.4 |
| $M_w$, end of cheln. (AMU) | 45000 | 50000 | 70000 | 50000 |
| $M_n$, end of cheln. (AMU) | 18000 | 19000 | 22000 | 19000 |
| $M_w/M_n$, end of cheln. | 2.5 | 2.6 | 3.2 | 2.6 |
| Weight % siloxane (%) | 4.71 | 4.75 | 5.09 | 4.77 |
| Silox. Incorp. Effic. (%) | 94 | 95 | 102 | 95 |
| Weight % Biphenyl (%) | 1.3 | 1.25 | 1.1 | 1.26 |
| Total OH (ppm) | — | — | — | 1532 |
| Total volatiles (%) | 0.89 | 0.22 | — | — |
| Residual Cu (ppm) | 64 | 23 | — | — |
| PROPERTIES AS A FUNCTION OF REACTION TIME | | | | |
| Wt. % siloxane, 80 min (%) | 2.98 | 0.60 | 0.9 | 0.17 |
| Wt. % siloxane, 110 min (%) | 4.55 | 4.42 | 5.03 | 3.67 |
| Wt. % siloxane, 200 min (%) | 4.56 | 4.67 | 5.07 | 4.64 |
| Silox. Incorp. Effic., 80 min (%) | 59.66 | 12.00 | 18 | 3.34 |
| Silox. Incorp. Effic., 110 min (%) | 90.97 | 88.40 | 100.6 | 73.33 |
| Silox. Incorp. Effic., 200 min (%) | 91.21 | 93.40 | 101.4 | 92.81 |
| IV, 80 min (dL/g) | 0.11 | 0.06 | 0.08 | 0.06 |
| IV, 110 min (dL/g) | 0.29 | 0.29 | 0.39 | 0.12 |
| IV, 200 min (dL/g) | 0.33 | 0.36 | 0.53 | 0.40 |

|  | Ex. 15 | Ex. 16 | Ex. 17 |
|---|---|---|---|
| REACTION CONDITIONS | | | |
| Toluene Source | Recyc. | Recyc. | Recyc. |
| DMBA level (%) | 2.4 | 1.2 | 1.2 |
| Solids (%) | 23 | 23 | 23 |
| Polysiloxane chain length | 45 | 45 | 45 |
| Polysiloxane loading (%) | 5 | 5 | 5 |
| Initial 2,6-DMP (%) | 7.9 | 7.9 | 7.9 |

TABLE 3-continued

| | | | |
|---|---|---|---|
| O:2,6-dimethylphenol mole ratio | 0.98 | 0.98 | 0.98 |
| Catalyst (%) | 0.9 | 0.75 | 0.75 |
| Temp., initial charge (° C.) | 21 | 21 | 21 |
| Temp., addition (° C.) | 38 | 38 | 38 |
| Temp., build (° C.) | 49 | 49 | 49 |
| Ramp time (min) | 30 | 30 | 30 |
| Ramp slope (° C./min) | 0.37 | 0.37 | 0.37 |
| Reaction time (min) | 200 | 200 | 200 |
| FINAL PRODUCT PROPERTIES | | | |
| Mol. Wt. <10K (%) | 13 | 11 | 13 |
| Mol. Wt. >100K (%) | 19 | 16 | 19 |
| IV, end of rxn. (dL/g) | 0.53 | 0.45 | 0.53 |
| IV, end of cheln. (dL/g) | 0.46 | 0.39 | 0.46 |
| $M_w$, end of rxn. (AMU) | 72000 | 64000 | 72000 |
| $M_n$, end of rxn. (AMU) | 27000 | 23000 | 27000 |
| $M_w/M_n$, end of rxn. | 2.7 | 2.8 | 2.7 |
| $M_w$, end of cheln. (AMU) | 67000 | 56000 | 67000 |
| $M_n$, end of cheln. (AMU) | 23000 | 20000 | 23000 |
| $M_w/M_n$, end of cheln. | 2.9 | 2.7 | 2.9 |
| Weight % siloxane (%) | 4.9 | 4.78 | 4.9 |
| Silox. Incorp. Effic. (%) | 98 | 96 | 98 |
| Weight % Biphenyl (%) | 1.16 | 1.26 | 1.16 |
| Total OH (ppm) | — | — | — |
| Total volatiles (%) | — | — | — |
| Residual Cu (ppm) | — | — | — |
| PROPERTIES AS A FUNCTION OF REACTION TIME | | | |
| Wt. % siloxane, 80 min (%) | 3.39 | 1.68 | 3.39 |
| Wt. % siloxane, 110 min (%) | 4.88 | 4.71 | 4.88 |
| Wt. % siloxane, 200 min (%) | 4.88 | 4.93 | 4.88 |
| Silox. Incorp. Effic., 80 min (%) | 67.87 | 33.64 | 67.87 |
| Silox. Incorp. Effic., 110 min (%) | 97.67 | 94.26 | 97.67 |
| Silox. Incorp. Effic., 200 min (%) | 97.59 | 98.57 | 97.59 |
| IV, 80 min (dL/g) | 0.15 | 0.087 | 0.15 |
| IV, 110 min (dL/g) | 0.48 | 0.36 | 0.48 |
| IV, 200 min (dL/g) | 0.53 | 0.452 | 0.53 |

For characterization of the composition as a function of molecular weight fraction, fractions from six gel permeation chromatography injections (36 mg of total material injected) were collected using a Gilson fraction collector. The effluent eluting between 12 and 25 minutes run time was divided over 60 test tubes which were later recombined to give 6 fractions with each contained approximately 16.67% of the total material (determined from area percent of the chromatogram). A small part (200 μl) of the five fractions was analyzed by gel permeation chromatography to confirm the success of the fractionation. The remaining part was used for $^1$H NMR analysis. The portion used for NMR analysis was evaporated to dryness at 50° C. under a nitrogen flow. One milliliter of deuterated chloroform (with tetramethylsilane as internal standard) was added and the samples were analyzed by $^1$H NMR (512 scans). The results, presented in Table 4, show, first, that all fractions contain substantial dimethylsiloxane contents. The fact that no "% tail" was detected in the highest molecular weight fraction indicates that this fraction is essentially free of poly(arylene ether) homopolymer; that is, it is essentially pure block copolymer. Similarly, the fact that the largest "% tail" was observed in the lowest molecular weight fraction means that the poly(arylene ether) is biased toward the lower molecular weight fractions.

TABLE 4

| Parent sample | Sample description | Siloxane weight (%) | Biphenyl weight (%) | Tail Weight (%) |
|---|---|---|---|---|
| Ex. 2 | Fraction 1 (83-100% of MW curve; highest MW fraction) | 4.70 | 1.19 | 0.00 |
| | Fraction-02 (67-83% of MW curve) | 4.39 | 0.41 | 0.53 |
| | Fraction-03 (50-67% of MW curve) | 4.19 | 1.06 | 0.22 |
| | Fraction-04 (33-50% of MW curve) | 4.54 | 1.37 | 0.28 |
| | Fraction-05 (17-33% of MW curve) | 5.39 | 1.80 | 0.34 |
| | Fraction-06 (0-17% of MW curve; lowest Mw fraction) | 7.11 | 2.74 | 1.01 |
| Ex. 14 | Fraction 1 (83-100% of MW curve; highest MW fraction) | 4.39 | 0.56 | 0.00 |
| | Fraction-02 (67-83% of MW curve) | 4.18 | 0.85 | 0.00 |
| | Fraction-03 (50-67% of MW curve) | 4.34 | 0.87 | 0.00 |
| | Fraction-04 (33-50% of MW curve) | 4.71 | 1.16 | 0.09 |
| | Fraction-05 (17-33% of MW curve) | 5.27 | 1.61 | 0.19 |
| | Fraction-06 (0-17% of MW curve; lowest Mw fraction) | 6.90 | 3.40 | 1.00 |

EXAMPLES 18 and 19

These examples illustrate the effect of precipitation antisolvent type on the final properties of the isolated product.

The reaction conditions for Examples 18 and 19 were the same as those for Example 17 as shown in Table 3, except that the reaction mixture and chelant solution were separated via liquid-liquid centrifuge rather than separatory funnel. Example 18 used precipitation in methanol, while Example 19 used precipitation in isopropanol. Characterization of the isolated products is summarized in Table 5. The results show a higher weight percent siloxane in the methanol-precipitated sample than the isopropanol-precipitated sample, which is consistent with the observation that isopropanol is a significantly better solvent for the hydroxyaryl-terminated polysiloxane than is methanol. Thus, precipitation with isopropanol can be an effective means of minimizing residual hydroxyaryl-terminated polysiloxane in the isolated product.

TABLE 5

|  | Ex. 18 | Ex. 19 |
| --- | --- | --- |
| Intrinsic viscosity (dL/g) | 0.391 | 0.403 |
| $M_n$ | 21401 | 22347 |
| $M_w$ | 56135 | 57151 |
| Wt. % siloxane (%) | 5.05 | 4.60 |

EXAMPLES 20-24

These examples use hydroxy end group derivatization with a phosphorus reagent and $^{31}$P NMR to characterize the hydroxyl end groups of various previously described samples.

Examples 20-24 used isolated products corresponding to Examples 2, 6-8, and 14, respectively. The hydroxyl groups of the isolated products were phosphorus derivatized and analyzed by $^{31}$P NMR as described in K. P. Chan et al., "Facile Quantitative Analysis of Hydroxyl End Groups of Poly(2,6-dimethyl-1,4-phenylene oxide)s by $^{31}$P NMR Spectroscopy", *Macromolecules*, volume 27, pages 6371-6375 (1994). The analysis was able to differentiate hydroxyl groups derived from 1-hydroxy-2,6-dimethyl phenyl groups ("Head" groups), 1-hydroxy-2-methyl-6-(di-n-butylaminomethyl) phenyl groups ("Mannich" groups), 2-methoxyphenyl groups ("Eugenol" groups), and 1-hydroxy-2-formyl-6-methyl phenyl groups ("Aldehyde" groups). Results are presented in Table 6 where mole percent values are based on total moles of head, Mannich, eugenol, and aldehyde groups. The results represent "fingerprints" of thermoplastic compositions prepared according to the present method.

TABLE 6

|  | Head groups (mol %) | Mannich groups (mol %) | Eugenol groups (mol %) | Aldehyde groups (mol %) |
| --- | --- | --- | --- | --- |
| Ex. 20 | 59.30 | 26.36 | 4.89 | 9.45 |
| Ex. 21 | 61.93 | 26.27 | 4.56 | 7.24 |
| Ex. 22 | 61.72 | 28.41 | 4.14 | 5.72 |
| Ex. 23 | 57.90 | 24.45 | 4.49 | 13.16 |
| Ex. 24 | 51.49 | 43.50 | 3.41 | 1.60 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a thermoplastic composition, comprising:

oxidatively copolymerizing a monohydric phenol and a hydroxyaryl-terminated polysiloxane to form a thermoplastic composition;

wherein the oxidative copolymerization is initiated in the presence of at least 50 weight percent of the hydroxyaryl-terminated polysiloxane and less than or equal to 50 weight percent of the monohydric phenol;

wherein the oxidative copolymerization is conducted with a reaction time greater than or equal to 110 minutes;

wherein the hydroxyaryl-terminated polysiloxane comprises, on average, 35 to 80 siloxane repeating units;

wherein the hydroxyaryl-terminated polysiloxane constitutes 1 to 8 weight percent of the combined weight of the monohydric phenol and the hydroxyaryl-terminated polysiloxane; and wherein the thermoplastic composition incorporates greater than 80 weight percent of the hydroxyaryl-terminated polysiloxane into the poly(arylene ether)-polysiloxane block copolymer.

2. The method of claim 1, wherein the thermoplastic composition comprises 1 to 8 weight percent siloxane repeating units and 12 to 99 weight percent arylene ether repeating units.

3. The method of claim 1, wherein the thermoplastic composition has a weight average molecular weight of at least 30,000 mass units.

4. The method of claim 1, wherein the thermoplastic composition incorporates greater than 90 weight percent of the hydroxyaryl-terminated polysiloxane into the poly(arylene ether)-polysiloxane block copolymer.

5. The method of claim 1, wherein the monohydric phenol is 2,6-dimethylphenol;

wherein the hydroxyaryl-terminated polysiloxane is a eugenol-capped polydimethylsiloxane comprising 35 to 60 dimethylsiloxane units;

wherein the oxidative copolymerization is initiated in the presence of at least 90 weight percent of the hydroxyaryl-terminated polysiloxane and 2 to 20 weight percent of the monohydric phenol;

wherein the oxidative copolymerization is conducted with a reaction time of 170 to 220 minutes; and wherein the hydroxyaryl-terminated polysiloxane constitutes 2 to 7 weight percent of the combined weight of the monohydric phenol and the capped polysiloxane.

* * * * *